United States Patent [19]

Wild

[11] Patent Number: 4,512,777

[45] Date of Patent: Apr. 23, 1985

[54] PURIFICATION OF AQUEOUS EFFLUENTS

[75] Inventor: Keith R. Wild, Tamworth, England

[73] Assignee: British Gas Corporation, England

[21] Appl. No.: 511,585

[22] Filed: Jul. 7, 1983

[30] Foreign Application Priority Data

Aug. 4, 1982 [GB] United Kingdom ............... 8222489

[51] Int. Cl.³ .............................................. C10J 3/00
[52] U.S. Cl. .......................................... 48/210; 55/85
[58] Field of Search ............ 55/84, 85, 89, 90, 92–94; 48/200–202, 210

[56] References Cited

U.S. PATENT DOCUMENTS

| | | | |
|---|---|---|---|
| 3,473,903 | 10/1969 | Paull et al. | 252/373 |
| 4,031,030 | 6/1977 | Rudolf | 48/202 |
| 4,036,606 | 7/1977 | Zimmermann et al. | 55/85 |
| 4,084,945 | 4/1978 | Chirico | 55/90 |

Primary Examiner—Bernard Nozick
Attorney, Agent, or Firm—Larson and Taylor

[57] ABSTRACT

Raw synthesis gases produced by the gasification of coal are treated to remove tars and oils by direct and indirect cooling to produce condensate streams which are treated under high pressure viz 5 to 150 bar to rapidly separate out aqueous and organic phases. Elevated temperatures may then be used to further minimize residence time. The invention is further characterized in that the size of the separation vessels is of several orders of magnitude smaller than used in conventional ambient pressure separation procedures.

4 Claims, 1 Drawing Figure

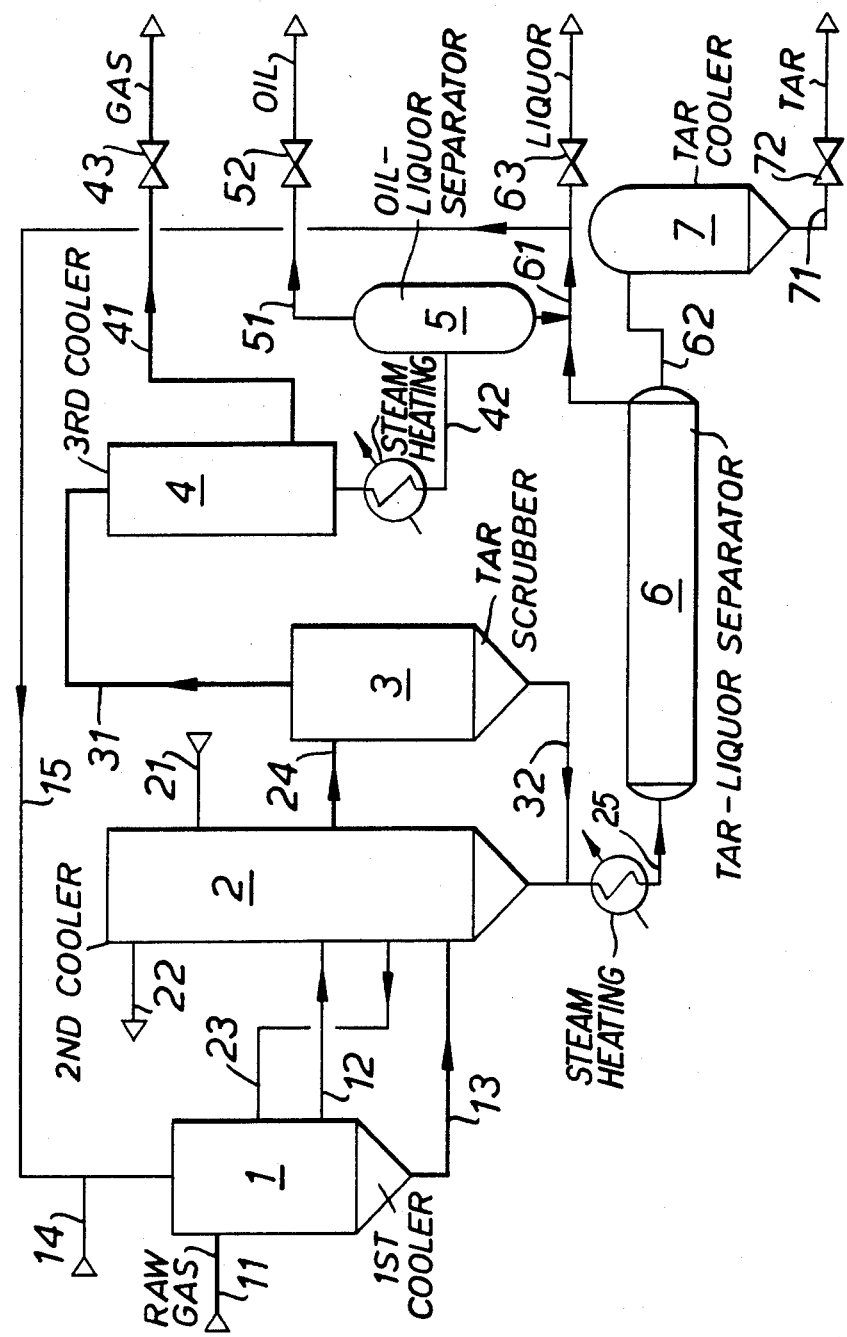

PURIFICATION OF AQUEOUS EFFLUENTS

This invention relates to separation systems, and more particularly, to the separation of organic and aqueous phases in effluents produced in the gasification of coal.

In the production of synthesis gases by the fixed bed steam/oxygen gasification of coal, effluent liquors are produced comprising water (from unreacted steam and coal moisture) and coal derived components such as tars and oils. Process economics and environmental considerations require that these effluents have to be treated before any portion can be discharged to waste. Modern coal gasification techniques that employ ash slagging conditions use less steam, as a steam to feed ratio, than the earlier dry-ash gasification techniques and, as a result, the effluent liquors are more concentrated. As a consequence they are more obnoxious in themselves and are more difficult to treat to achieve acceptable separation of the phases.

In conventional gas treatment techniques, for example, as described in U.S. Pat. No. 4,187,080 and 4,097,539 the raw synthesis gas is cooled, for example by quenching followed by indirect heat exchange in a waste heat boiler. A liquid condensate (containing tar, oil and water with dissolved components such as phenols) is taken from the sump of the boiler, cooled, depressurised and transferred to a number of large settling vessels, in series, operating near atmospheric pressure. These large vessels provide a suitably long residence time to enable separation to occur firstly between the tar and the other components and secondly, separation of the oil from the liquor, both these separations occurring owing to the respective density differences of the liquid phases. This conventional system has a number of disadvantages. Firstly, the need for long residence times mean that large vessels are required and high costs are incurred. Secondly, the separators must be operated within a narrow temperature range, the upper temperature being the boiling point of one of the phases and the lower one being sufficiently high to enable transfer of the inherently viscous tar. A further disadvantage is that depressurisation of the condensate liquid streams across pipework constrictions, eg. level control valves, can cause emulsification owing to the severe turbulence around the constricted area, making separation more difficult or even impossible using conventional settling vessels.

We have now found that these problems can be alleviated or overcome by effecting separation at substantially higher pressures, and with greater advantage, at higher temperatures than hitherto have been employed.

Accordingly the present invention provides a process for the separation of aqueous and organic condensible materials from a synthesis gas wherein said aqueous and organic materials are condensed out by cooling said gas, preferably by a first direct cooling upon contact with an aqueous liquor and thereafter by indirect heat exchange, said condensation being effected at a pressure within the range 5 to 150 bar, the improvement consisting in effecting separation of the condensate into an aqueous phase and an organic tar phase at pressure of 5 to 150 bar and at a temperature of 125° C. to 250° C.

The synthesis gas may be subjected to further cooling to condense out a liquor comprising an oil phase and an aqueous phase at a pressure of 5 to 150 bar at a temperature from 30° C. to 200° C. Optionally the oil liquor is heated after condensation and prior to separation.

The invention will be desribed and exemplified with reference to the accompanying drawing which is a schematic flow diagram of the effluent treatment of raw synthesis gas.

Raw synthesis gas, for example, at a temperature of 550° C. and a pressure of 35 bar (gauge) from a primary synthesis reactor (not shown) is passed into a first cooler (1) via line 11. Within cooler 1 the gas is directly contacted and saturated with an aqueous quench liquor comprising liquor from storage (14), recycled liquor (15) obtained from the separation process and a recycle stream (23) from a downstream cooler. Upon quenching and saturation a condensate is formed which is removed via line 13. The steam laden gas is passed either together with the condensate through line 13, or separately through line 12, to a second cooler (2) which is a waste heat boiler. In cooler 2, the gas is in indirect heat exchange with boiler feed water (21) used for steam raising (22). On cooling of the gas, some of the water, present in saturated gas condenses out and is added to the condensate from line 13 in the lower portion of vessel 2. Some separation occurs between the tar and aqueous phases and some of the separated aqueous liquor may be recycled back to the first cooler 1.

Typically, the temperature of the gas and effluent has been reduced from about 550° C. at the inlet of the first cooler to between 150° C. and 190° C. at the outlets of the second cooler.

The cooled gas is then passed, via line 24 to a tar scrubber 3 in which the last traces of tar are removed. The liquid effluent (32) from scrubber 3 is combined with the effluent from the second cooler 2 to form stream 25 which is and passed with substantially no pressure relief to a high pressure separator vessel 6 wherein the tar and the aqueous liquor separate substantially completely.

Typically, at liquor flowrates of 2000 Kg. hr$^{-1}$ and a tar flow-rate of 600 Kg. hr$^{-1}$ satisfactory separation is achieved in ten minutes at a pressure of 31 bar (gauge) and a temperature of 165° C. using a separator of 0.46 m$^3$ volume. Conventional techniques, eg. at 70° C. and 0.02 bar (gauge) would require a vessel of 36 m$^3$ volume and a residence time of 12 hours to achieve satisfactory separation at the same flowrates.

The liquor and tar streams, 61 and 62, are removed separately from vessel 6. The tar stream 62 is cooled to about 70° C. (so as not to reduce the viscosity too much), removed via line 71, depressurised through valve 72 and taken for storage.

The gas 31 from scrubber 3 is further cooled in a third cooler 4 to about 35° C. and removed via line 41 and control valve 43. Within cooler 4 condensibles are substantially removed and a liquid effluent is produced comprising an oil phase and an aqueous phase which is passed via line 42 to a high pressure oil-liquor separator 5.

Thus for an oil flow rate of 130 Kg. hr$^{-1}$ and a liquor flow rate of 4300 Kg. hr$^{-1}$ satisfactory separation is achieved in ten minutes in a vessel of 0.75 m$^3$ volume operating at a pressure of 31.0 bar (gauge) and a temperature of 35° C.

Alternatively, the liquor 42 may be reheated (heater not shown) to a temperature of not more than 200° C. prior to entry into the oil-liquor separator (5).

The oil phase from vessel 5 is removed via line 51, pressure relieved through valve 52 and taken to storage.

The aqueous phase from vessel 5 and the aqueous phase from the tar separator 6 are combined to form stream 61. A portion of steam 61 is recycled via line 15 for use as the quench medium in the first cooler 1. The remaining portion of stream 61 is pressure relieved through valve 63 and taken to storage and for possible reuse through line 14.

By operating in accordance with the present invention the disadvantages associated with the prior art methods are avoided, resulting in rapid separation without the formation of emulsions and relatively small vessels.

Additionally, by operation at elevated temperatures and pressures, materials having similar densities can be separated efficiently. These materials may take months to effectively separate out using conventional settling vessels.

I claim:

1. In a process for the separation of aqueous and organic condensible tar liquid from a synthesis gas produced by gasification of coal wherein said aqueous and organic tar liquid are condensed out by cooling, said condensation being effected at a pressure within the range 5 to 150 bar, the improvement consisting in effecting separation of the condensate into an aqueous phase and an organic tar liquid phase at a pressure of 5 to 150 bar and at a temperature of 125° C. to 250° C. in a separator.

2. A process as claimed in claim 1 wherein said condensation is effected by a first direct cooling upon contact with an aqueous liquor and thereafter by indirect heat-exchange.

3. A process as claimed in claim 1 wherein said synthesis gas is further cooled to condense out a liquor comprising an oil phase and an aqueous phase and thereafter separation of said oil and aqueous phases is effected at a pressure of from 5 to 150 bar and at a temperature of from 30° C. to 200° C.

4. A process as claimed in claim 3 wherein after condensation the liquor is heated prior to separation.

* * * * *